(12) United States Patent
Van Hooft (10) Patent No.: US 11,656,695 B2
(45) Date of Patent: May 23, 2023

(54) COMPUTER MOUSE FOR DIFFERENT MODES OF USE

(71) Applicant: OAHWIP B.V., Vught (NL)

(72) Inventor: Jan Thomas Lambertus Van Hooft, Kerkdriel (NL)

(73) Assignee: OAHWIP B.V., Vught (NL)

( * ) Notice: Subject to any disclaimer, the term of this patent is extended or adjusted under 35 U.S.C. 154(b) by 0 days.

(21) Appl. No.: 17/309,832

(22) PCT Filed: Dec. 31, 2018

(86) PCT No.: PCT/NL2018/050895
§ 371 (c)(1),
(2) Date: Jun. 22, 2021

(87) PCT Pub. No.: WO2020/141971
PCT Pub. Date: Jul. 9, 2020

(65) Prior Publication Data
US 2022/0050534 A1   Feb. 17, 2022

(51) Int. Cl.
*G06F 3/0354* (2013.01)
*G06F 3/02* (2006.01)
(Continued)

(52) U.S. Cl.
CPC ........ *G06F 3/03543* (2013.01); *G06F 3/0202* (2013.01); *G06F 3/0383* (2013.01);
(Continued)

(58) Field of Classification Search
CPC ............... G06F 3/03543; G06F 3/0202; G06F 3/03547; G06F 3/0383; G06F 3/0487; G06F 2203/0334
See application file for complete search history.

(56) References Cited

U.S. PATENT DOCUMENTS 5,576,733 A   11/1996 Lo
5,648,798 A   7/1997 Hamling
(Continued)

FOREIGN PATENT DOCUMENTS

CN   200990072 Y   12/2007
GB   2464925   5/2010
(Continued)

OTHER PUBLICATIONS

European Patent Office Communication Pursuant to Article 94(3) EPC, Application No. 18845376.5, dated Mar. 10, 2023, 7 pages.

*Primary Examiner* — Jonathan A Boyd
(74) *Attorney, Agent, or Firm* — Adsero IP (57) ABSTRACT

A computer mouse has a mouse button face with at least one mouse button for operation by a finger of a user and a thumb face opposite of the mouse button face for engagement by a thumb of that user. At least one sensor is provided for detecting a mode of operation by a user. In a first detected mode of operation, a displacement operation by a user causes a user interface display of a computer system to show a movement in a direction in a displayed image. In a second detected mode of operation, the same displacement operation by a user causes the user interface display to show a different movement in a different direction in the displayed image. Also described is a mouse with a touchpad surface area partially located between mouse buttons, partially overlapping the buttons and partially in flexible hinge areas of caps of the buttons.

16 Claims, 4 Drawing Sheets

(51) Int. Cl.
*G06F 3/038* (2013.01)
*G06F 3/0487* (2013.01)

(52) U.S. Cl.
CPC ........ *G06F 3/03547* (2013.01); *G06F 3/0487* (2013.01); *G06F 2203/0334* (2013.01)

(56) References Cited

U.S. PATENT DOCUMENTS

| | | | |
|---|---|---|---|
| 6,072,471 A | 6/2000 | Lo | |
| 6,489,948 B1* | 12/2002 | Lau | G06F 3/0383 345/163 |
| 6,970,159 B2* | 11/2005 | Gray | G06F 3/03547 345/173 |
| 2003/0071789 A1 | 4/2003 | O'Keeffe et al. | |
| 2003/0160765 A1 | 8/2003 | Gordon | |
| 2005/0179650 A1* | 8/2005 | Ludwig | G06F 3/04847 345/156 |
| 2005/0248533 A1 | 11/2005 | Chu | |
| 2008/0042041 A1 | 2/2008 | Cheah et al. | |
| 2008/0297476 A1 | 12/2008 | Hotelling et al. | |
| 2008/0297478 A1* | 12/2008 | Hotelling | G06F 3/03544 345/163 |
| 2010/0245246 A1* | 9/2010 | Rosenfeld | G06F 3/0446 345/163 |
| 2010/0309128 A1* | 12/2010 | Ma | G06F 3/0383 345/166 |
| 2011/0109552 A1* | 5/2011 | Yasutake | G06F 3/04883 345/173 |
| 2013/0120262 A1 | 5/2013 | Piot et al. | |
| 2013/0169424 A1* | 7/2013 | Kujawski | G06F 3/016 340/407.2 |
| 2013/0257729 A1* | 10/2013 | Edwards | G06F 3/04883 345/173 |

FOREIGN PATENT DOCUMENTS

| | | |
|---|---|---|
| GB | 2472855 A | 2/2011 |
| WO | WO 2005/022374 A1 | 3/2005 |

* cited by examiner

COMPUTER MOUSE FOR DIFFERENT MODES OF USE

RELATED APPLICATIONS

This application is a § 371 national phase application of PCT/NL2018/050895 (WO 2020/141971), filed on Dec. 31, 2018, entitled "Computer Mouse for Different Modes of Use", which is incorporated herein by reference in its entirety.

FIELD AND BACKGROUND OF THE INVENTION

The invention relates to an upright computer mouse for left and right hand use.

U.S. Pat. No. 5,576,733 discloses a computer mouse having a finger-supporting surface with mouse buttons arranged in generally vertical columns on opposite sides, which allows the mouse to be operated both left-handed and right-handed. This allows the mouse to be used by left handed and right handed users or a user can use the mouse both left and right handed, which reduces the risk of Repetitive Strain Injury (RSI).

U.S. Pat. No. 6,072,471 discloses a computer mouse having a finger-supporting surface with two sets of mouse buttons arranged in generally vertical columns on a common first side of the mouse and a thumb support on an opposite second side of the mouse. The first and second sides of the mouse are each symmetrical about a plane perpendicular to a base of the mouse.

Also this mouse can be operated both left and right handed. In relation to a hand of a user holding the mouse, the buttons to be operated are the buttons of a distal one of the sets of buttons. The mouse has a switch to selectively disable one of the sets of buttons to avoid accidental activation. The switch may also be provided in the form of a pivotable cable attachment. For right handed use, the cable may be pivoted to have a curvature to the right (i.e. in a distal direction when the mouse is held for right handed operation) and for left handed use, the cable may be pivoted to have a curvature to the left (i.e. in a distal direction when the mouse is held for left handed operation).

International patent application WO2011/020990 discloses a computer mouse having a finger-supporting surface with one set of mouse buttons arranged in a generally vertical column on a common side of the mouse and a thumb support on an opposite side of the mouse. The buttons extend across the full width of the device. The first and second sides of the mouse are each symmetrical about a plane perpendicular to a base of the mouse. A scroll wheel is provided in the finger surface between the buttons and orientated for rotation in a generally horizontal plane.

Also this mouse can be operated both left and right handed. Regardless whether the mouse is operated left or right handed, the buttons to be operated are the same. The mouse includes a push button for switching between left-handed and right-handed operation modes, with associated mode indication LEDs. An optical motion sensor and a rotary encoder to which the scroll wheel is connected include circuitry for causing movement axes and scroll wheel direction to be reversed and translated into appropriate computer input for the selected handedness of operation of the mouse. The mouse further has memory means to store settings of the device, such as the sense of the device (left-handed or right-handed).

In use of the mouse, the body may be gripped by a selected hand of a user, with the tip of the thumb and the tips of the index finger and middle finger engaging the buttons in a precision grip. By flexing the joints of the thumb and fingers, the mouse (and hence an associated pointer or cursor positioning mark of a graphical user interface) can be moved across the work surface in the space between the thumb and fingers towards and away from the palm of the user. This allows both small scale, precise positioning as well as large scale movements.

SUMMARY OF THE INVENTION

It is an object of the present invention to provide a computer mouse that can easily be operated in different modes of use, thereby facilitating varied use and reducing the risk of RSI.

This object is achieved by providing a computer mouse according to claim 1.

In use, the sensor or sensors detect a mode of operation by a user and the circuitry automatically provides that, if a first mode of operation has been detected, in response to a displacement operation by a user, a first signal is outputted that causes a user interface display of a computer system communicating with the mouse to show a first movement in a first direction in a displayed image. If, however, via the sensor, a second mode of operation has been detected, in response to the same displacement operation (relative to the mouse), a second signal is outputted, which is different from the first signal and causes the user interface display to show a second movement in a second direction in a displayed image, which second direction is different from the first direction.

Thus, for instance, a movement of the mouse over the surface plane (e.g. a desktop surface) in a direction relative to the orientation of the mouse that causes, if the mouse is in the first operating mode, a pointer on the display to move upwards, may cause the pointer to move downwards obliquely if the mouse in the same orientation is in the second operating mode. Also, while a scrolling operating input may causes the displayed window to scroll down in a first operating mode, the same scrolling operating input may cause the displayed window to move up or sideways if the mouse is in the second operating mode. Thus, the mouse automatically takes into account the detected one of different possible gripping modes in which the mouse is held, so that when the mouse is held in a different manner, such as left-handed instead of right handed and/or either between finger tips and thumb instead of between the thumb and (also) proximal phalanxes of the fingers.

Since the operating mode is automatically detected by the mouse, a user can simply use the mouse without having to change mouse settings to adapt the mouse for an intended mode of use. Moreover, this allows the user to randomly use the mouse in different modes, which avoids prolonged repetitive tensioning of the same parts of the body, which is a risk factor related to the occurrence of RSI.

In another embodiment, the invention provides a computer mouse according to claim 13.

Since the flexible hinge areas are at least partially in the touch pad surface area and portions of the caps of the buttons also form portions of the touchpad surface area, the touchpad surface area can be relatively large. Nevertheless, operation of the touchpad surface area is not compromised by seams between button caps and neighboring portions of the touchpad surface area and inadvertently operating these buttons by touching the buttons in the area of the caps of the button that are part of the touchpad surface will not or hardly occur in practice.

Particular elaborations and embodiments of the invention are set forth in the dependent claims.

Further features, effects and details of the invention appear from the detailed description and the drawings.

DETAILED DESCRIPTION

In the drawings, several views of an example of a computer mouse 1 according to the invention are shown. The computer mouse 1 has a bottom face 2 defining a plane 3 on which the mouse 1 rests if positioned on a plane surface, such as a desktop surface or a mouse mat surface.

On its outside, the mouse 1 further has front side forming a mouse button face 4 leaning backward. The mouse button face 4 is preferably slanted backward so that it is oriented at an average enclosed angle $α_i$ between the mouse button face 4 and the surface plane 3 of more than 60° and more preferably of 70-80° to allow comfortable operation of the mouse 1. The mouse button face 4 is arranged to be engaged by fingers of a user, in particular by an index finger and a middle finger, although engagement by a ring finger or a little finger may also be provided for. A thumb face 5 of the mouse 1 is located on a rear side of the mouse 1 opposite of and facing away from the mouse button face 4. The thumb face 5 is arranged for engagement by a thumb of a user hand of which one or more fingers is in engagement with the mouse button face 4.

The button face 4 is preferably slightly hollow for positive positioning of the finger tips with no tendency to slip off the mouse buttons. To this end, the lower buttons preferably slant more than the upper buttons, e.g. by 8-12 mm for the lower buttons while the upper buttons, which are of generally the same height and width as the upper buttons, slant backward by 2-6 mm.

In this example, four mouse buttons 6, 7, 8, 9 are arranged at the mouse button face 4 for operation by fingers of the user hand. Although in this example, four mouse buttons 6-9 are provided, it is also possible to provide a different number of mouse buttons, e.g. one, two, three or more than four buttons. Also, the buttons may be in the form of one or more touch or pressure sensitive surfaces.

The mouse further has left or right handed use sensors 10, 11 for detecting a mode of operation by a user. In this example, also the buttons 6-9 constitute sensors for detecting a mode of operation as will be explained below.

Figure 7:
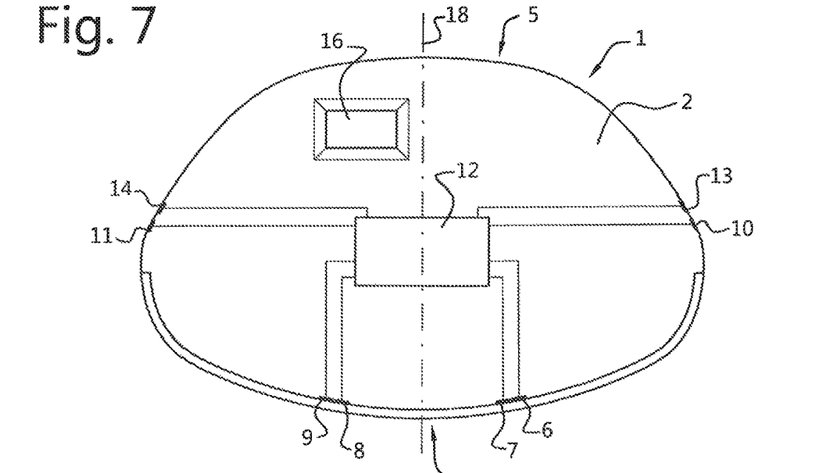
FIG. 7 is a bottom view of the mouse shown in FIGS. 1-6.

Inside the mouse 1, circuitry (schematically designated by reference numeral 12 in FIG. 7) connected to the buttons 6-9 and to the left or right handed use sensors 10, 11 is provided for, in a first detected mode of operation, in response to a displacement operation by a user, such as movement in a given direction, outputting a first signal for causing a user interface display of a computer system communicating with the mouse to show a first movement in a first direction in a displayed image and, in a second detected mode of operation, in response to the same displacement operation by a user, outputting a second signal different from the first signal for causing the user interface display to show a second movement in a second direction in a displayed image. This second direction is different from the first direction.

The mouse further has two ports 13, 14 connected to the circuitry 12 for wired connection of the mouse circuitry 12 to a computer system. In this example, the ports are micro USB ports, but other ports, such as mini USB, USB-C or a non standardized port, may also be provided. Communication of the mouse circuitry with a computer system may also be in wireless form, for instance using the so called Bluetooth protocol. The ports or one port may also be arranged for charging a battery of the mouse via the port or ports.

In a bottom face 2 of the mouse, an optical sensor 16 for detecting amounts and directions of movement of the mouse over a surface (e.g. a desktop or a mouse mat) is provided. Alternatively or additionally, other known detectors for detecting movement of a computer mouse over a surface may be provided.

The mouse 1 further has a tactile sensor in the form of a touchpad 17 centrally between the buttons 6-9. The circuitry 12 is further arranged for translating the motion and position of a user's finger moving along its surface to a scrolling movement on the display 15. As in the present example, the touchpad can for instance be a capacitance-based sensor. Alternatively or additionally, other known sensors for detecting motion of a finger along a surface or other scrolling input interfaces, such as a scroll wheel or a track ball may be provided.

In use, the sensors 6-11 detect a mode of operation by a user and the circuitry 12 automatically provides that, if a first mode of operation has been detected, in response to a displacement operation by a user, a first signal is outputted that causes a user interface display of a computer system communicating with the mouse to show a first movement in a first direction in a displayed image. If however, via one or more of the sensors 6-11, another mode of operation has been detected, in response to the same displacement operation (relative to the mouse), another signal is outputted, which is different from the first signal and causes the user interface display to show a another movement in another direction in a displayed image. This other direction is different from the first direction.

Figure 8:
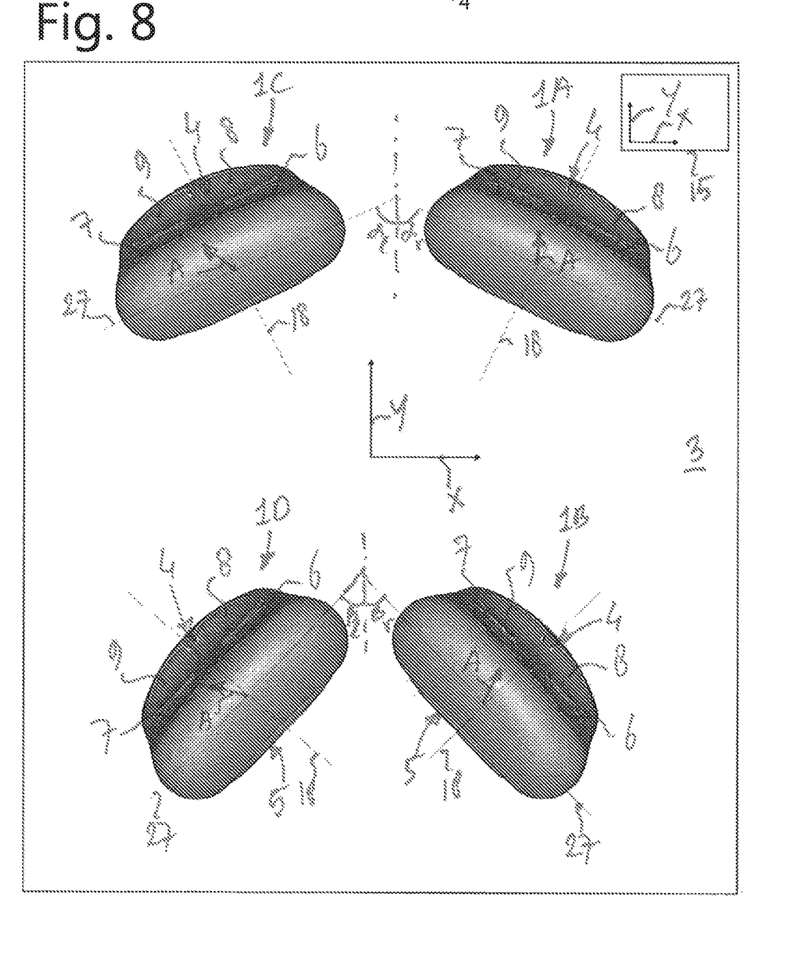
FIG. 8 shows mouses according to FIGS. 1-7 in top plan view in four operating modes and associated orientations in combination with boundaries of an imaginary image area of a user interface display of a computer system.

In FIG. 8, four mouses 1A, 1B, 1C, 1D according to FIGS. 1-7 are shown in different orientations in which such mouses are generally held in different operating modes. Mouse 1A is in an orientation associated to right handed operation holding the mouse with a precision grip in which finger tips are positioned for engaging the proximal ones 6, 8 of the buttons. Mouse 1B is in an orientation associated to right handed operation holding the mouse with a full grip in which finger tips are positioned for engaging the distal ones 7, 9 of the buttons. Mouse 1C is in an orientation associated to left handed operation holding the mouse with a precision grip in which finger tips are positioned for engaging the proximal ones 7, 9 of the buttons (note that, in right handed operation, the same buttons 7, 9 are the proximal ones of the buttons). Mouse 1D is in an orientation associated to left handed operation holding the mouse with a full grip in which finger tips are positioned for engaging the distal ones 6, 8 of the buttons (note that, in right handed operation, the same buttons 6, 8 are the distal ones of the buttons).

If a mouse 1 is for instance moved in a direction Y over surface plane 3, it is desirable if a pointer or cursor positioning mark on a display 15 of a computer system to which the mouse 1 is connected also moves in a corresponding direction Y (a representation of the display 15 scaled down to a reduced size is shown on the surface 3, but will in practice usually be in an orientation that is generally vertical or slightly slanting from vertical). Thus, movement of the mouse 1A, 1B, 1C or 1D, in the orientation associated to the respective mode of operation, relative to the coordinate system X, Y on the surface plane 3 causes movement of the pointer or cursor positing mark relative to the coordinate system X, Y on the display 15 in the corresponding direction.

This also means that movement of a mouse 1A in a right handed precision grip operating mode in a direction A relative to the mouse 1A, which results in movement of the pointer or cursor positioning mark on the display 15 in the corresponding direction Y relative to the display screen, but movement of the same mouse 1B, 1C and 1D, in the other operating conditions and oriented accordingly, in the same direction A, relative to the mouse, results in movement of the pointer or cursor positioning mark in different directions corresponding to the directions indicated by arrows A at the respective mouses 1B, 1C and 1D relative to the coordinate system X,Y of the surface plane 3.

After detection of the respective associated operating condition, movement of the accordingly oriented mouses 1B, 1C and 1D in the direction Y results in movement of the pointer or cursor positioning mark on the display 15 in the direction Y as well. The same also applies to movements of the mouses 1A-1D in other directions relative to the coordinate system X, Y of the surface plane 3.

Thus the mouse 1 automatically takes into account the different orientations in which the mouse 1A-1D is held when it is held in a different manner, such as either left-handed or right handed and either a precision grip between finger tips and thumb or a (more) full grip between the thumb and (also) proximal phalanxes of the fingers.

To allow the mouse 1 to be used equally well in left and right handed modes of operation, the mouse button face 4 and the thumb face 5 are each symmetrical about a common symmetry plane 18 perpendicular to the surface plane 3. Furthermore, seen in to plan view, the mouse 1 is elongate in a horizontal longitudinal direction 27 perpendicular to the common symmetry plane 18.

For adjustment to left and right handed operation, the relationship between directions of movement of the mouse 1 in corresponding left handed and right handed operation that result in movement on the display 15 in a given direction is preferably such that the direction of a displacement of the mouse 1C, 1D in the or each of the left hand mode of operation that causes movement on the display 15 in a given direction is mirror symmetrical about the symmetry plane 18 to the direction of displacement of the mouse 1A, 1B in the corresponding right hand mode of operation that causes movement on the display 15 in the same direction.

The direction of movement of the mouse 1A in the right-handed precision grip mode causing upward movement in Y direction of the pointer on the screen 15 is preferably oriented at an angle $\alpha_r$ of 60-70°, and more preferably of about 63-67°, rotated to the right of the longitudinal direction 27 of the mouse 1A.

The direction of movement of the mouse 1B in the right-handed full grip mode causing upward movement in Y direction of the pointer on the screen 15 is preferably oriented at an angle $\beta_r$ of 40-50°, and more preferably of about 43-47°, rotated to the right of the longitudinal direction 27 of the mouse 1A.

The direction of movement of the mouse 1C in the left-handed precision grip mode causing upward movement in Y direction of the pointer on the screen 15 is preferably oriented at an angle $\alpha_l$ of 60-70°, and more preferably of about 63-67°, rotated to the left of the longitudinal direction 27 of the mouse 1A.

The direction of movement of the mouse 1D in the right-handed full grip mode causing upward movement in Y direction of the pointer on the screen 15 is preferably oriented at an angle $\beta_l$ of 40-50°, and more preferably of about 43-47°, rotated to the left of the longitudinal direction 27 of the mouse 1A.

The precise angles $\alpha$ and $\beta$ may be adjustable to accommodate to user morphology and preferences. Adjustability may allow different settings for the angles $\alpha$ and $\beta$ for left and right handed operation.

Another operational feature of the mouse 1 that is directionally adapted to the detected operating mode is a scroll function that is operated by moving a finger tip along the touchpad 17 that is mounted between the buttons 6-9. When left handed operation is detected instead of right handed operation, the direction of an input that causes scrolling in Y direction on the display 15 is mirrored about symmetry plane 18.

Figure 1:
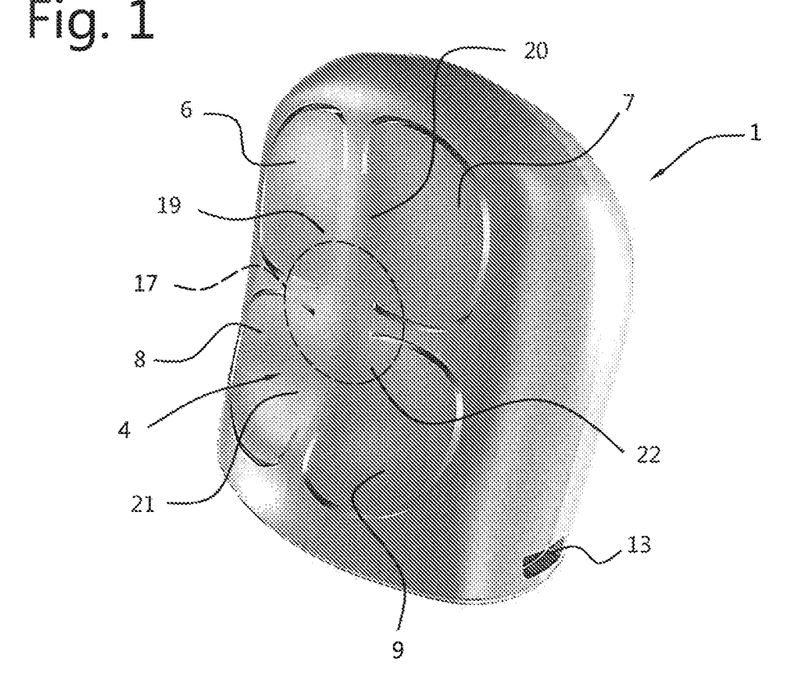
FIG. 1 is a perspective view of mainly a front side of an example of a computer mouse according to the invention.
Figure 2:
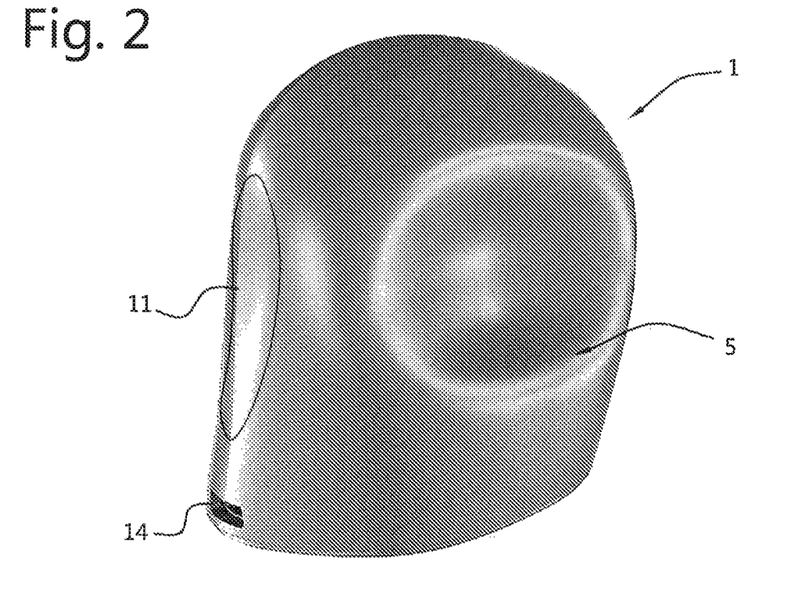
FIG. 2 is a further perspective view of mainly a rear side of the computer mouse shown in FIG. 1.
Figure 3:
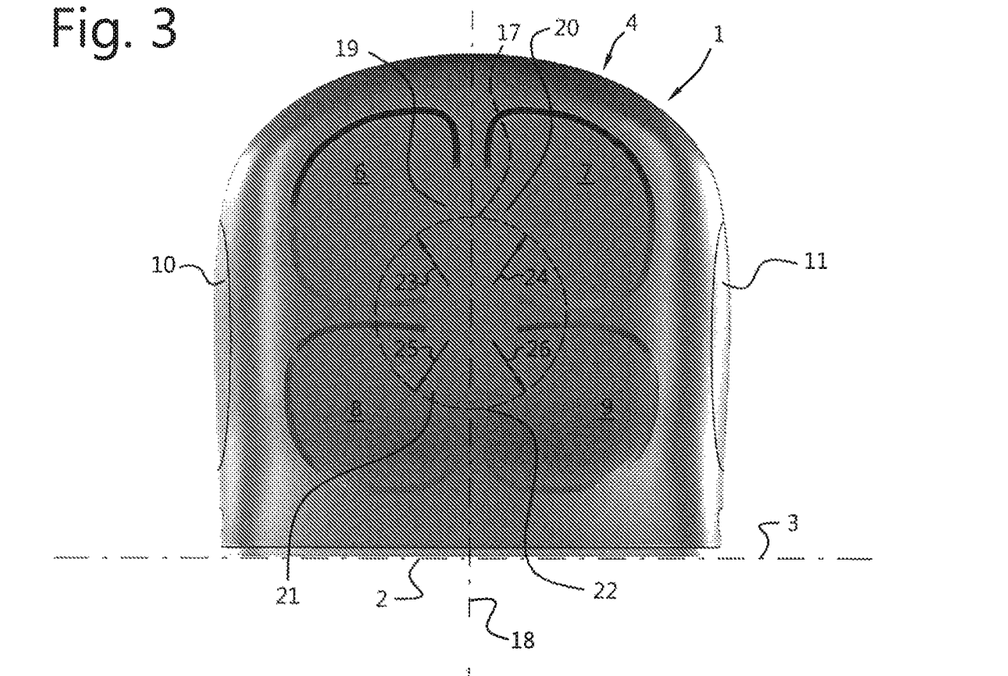
FIG. 3 is a front side view of the computer mouse shown in FIGS. 1 and 2.
Figure 4:
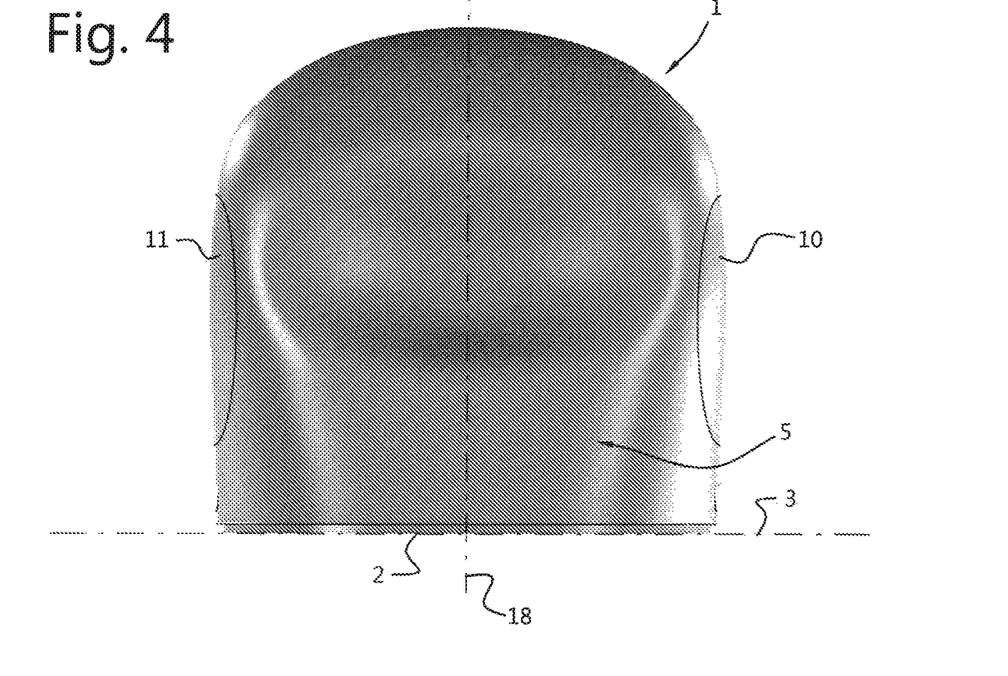
FIG. 4 is a rear side view of a side of the computer mouse shown in FIGS. 1-3 opposite to the side shown in FIG. 1.
Figure 5:
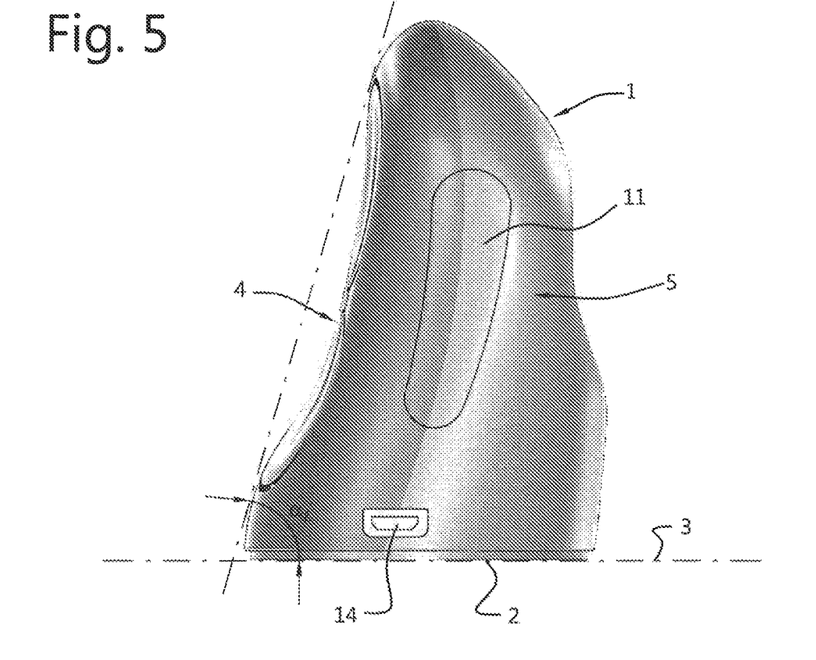
FIG. 5 is a side view of a side of the computer mouse shown in FIGS. 1-4 transverse to the views shown in FIGS. 3 and 4.
Figure 6:
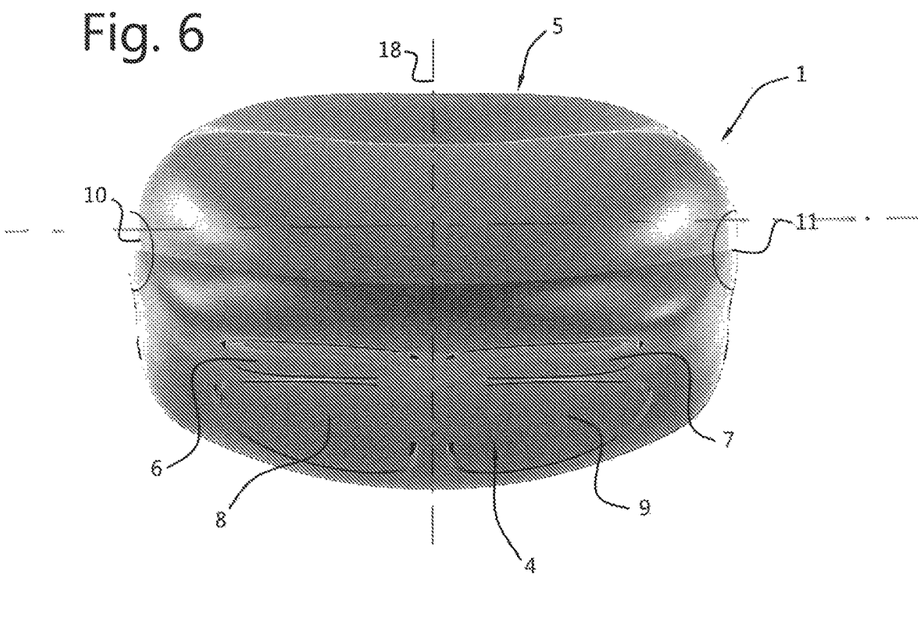
FIG. 6 is a top plan view of the mouse shown in FIGS. 1-5.

The relationship between direction of input seen in frontal view as shown in FIG. 3 and the direction of scrolling on the display 15 is as set forth in the table below:

| Mode of operation | Direction of input | Reference numeral | Scrolling direction |
| --- | --- | --- | --- |
| Left hand | Down-right | 26 | X-Right |
| Left hand | Up-right | 24 | Y-Down |
| Left hand | Down-left | 25 | Y-Up |
| Left hand | Up-left | 23 | X-Left |
| Right hand | Down-right | 26 | Y-Up |
| Right hand | Up-right | 24 | X-Left |
| Right hand | Down-left | 25 | X-Right |
| Right hand | Up-left | 23 | Y-Down |

Thus, diagonal input movements along the scrolling input interface 17 of the mouse result in horizontal and vertical scrolling movement of the image on the display 15. Thus, the diagonal orientation of movement of finger tips when fingers engaging the mouse are flexed and extended result in vertical scrolling movement while movement of the fingers that are lateral in relation to the user's hand result in horizontal scrolling of the image on the display 15.

It is noted that the direction of scrolling may generally also be adjustable by selecting a user setting in the computer operating system or mouse driver software. Some users prefer the image to move in the inputted direction, while other users prefer the window of view to (virtually) move relative to the displayed image in the inputted direction, so that the image moves in the opposite direction.

Since the left or right handed operating mode is automatically detected by the mouse 1, a user can simply use the mouse 1 without having to change mouse settings to adjust settings of the mouse 1 for an intended mode of use. Moreover, this allows the user to randomly use the mouse 1 during alternating periods of time in both left and right handed modes of operation, which avoids prolonged repetitive tensioning of the same parts of the body, which is a risk factor related to the occurrence of RSI.

In the present example, detection whether the mouse 1 is used left or right handed mode is detected by the sensors 10, 11 at lateral end portions of the mouse button face 4. The left or right handed use sensors 10, 11 are also arranged at lateral ends of the mouse 1 and facing away from the central plane 18 of the mouse 1 in lateral directions. As in this example, the left or right handed use sensors 10, 11 may for instance be capacitive proximity sensors that sense the proximity of a palm of a hand of a user closely adjacent to the left lateral end portion of the mouse button face 4 in right handed use and closely adjacent to the right lateral end portion of the mouse button face 4 in left handed use. It is observed that also other types of sensors may be used for this purpose, such as temperature sensors and/or light sensors. Furthermore, it is also possible to use only a single sensor for sensing left or right handed operation, assuming that if no proximity, obscuring of light, rise of temperature or other phenomenon indicating the presence of a palm of a hand is detected, the palm of the hand of the user can be assumed to be closely adjacent to the other lateral end of the mouse button face 4 and of the mouse 1. Alternatively or additionally, the sensors for sensing whether the mouse is operated in a left or right hand mode of operation may also be located at or extend to the lateral end portions of the thumb face.

In the present example, grip sensors for distinguishing the mode of operation of the mouse in which it is held in the precision grip or the full grip are provided in the form of the mouse buttons 6-9. If, in right hand mode of operation, engagement (e.g. operation) of a button 6, 8 on a left hand portion of the mouse button face 4 is sensed, a precision grip mode of operation (1A in FIG. 8) is detected while, if engagement (e.g. operation) of a button 7, 9 on a right hand portion of the mouse button face 4 is sensed, a full grip mode of operation (1B in FIG. 8) is detected. Conversely, if, in left hand mode of operation, engagement (e.g. operation) of a button 6, 8 on a left hand portion of the mouse button face 4 is sensed, a full grip mode of operation (1D in FIG. 8) is detected while, if engagement (e.g. operation) of a button 7, 9 on a right hand portion of the mouse button face 4 is sensed, a precision grip mode of operation (1C in FIG. 8) is detected. Otherwise, the mouse buttons 6, 7 and 8, 9 at the same horizontal levels have the same function.

Instead of by sensing at the mouse button side of the mouse, precision and full grip modes of operation can also be sensed at the thumb engagement side of the mouse. In the full grip mode of operation, the mouse will extend distally further along the mouse than in the precision grip mode of operation. By sensing whether the thumb extends far or over a smaller distance distally along the mouse, it can be detected whether the mouse is in the full grip mode of operation or the precision grip mode of operation.

Because the mouse buttons 6-9 are used as the sensors for detecting whether the mouse is in the full grip mode of operation or in the precision grip mode of operation, no sensor specifically for this purpose is needed. An additional push button contact for each mouse button function is sufficient and can be provided at low cost.

The direction of movement of input commands for scrolling in the precision grip and full grip modes of operation preferably differ by 15-30° and preferably by about 20° to accommodate to the differences in orientation of a mouse 1 on a desktop while being held comfortably by hand of a user in the precision grip mode of operation and in the full grip mode of operation.

For easy and comfortable operation of the mouse 1 in both the precision grip mode of operation and the full grip mode of operation, its thickness at half height in a direction parallel to the plane of symmetry 18 is preferably larger than 8 mm to provide accurate control over the orientation of the mouse 1 in rotational sense about a vertical axis and preferably smaller than 25 mm for ease of holding the mouse 1 in both the precision grip and full grip modes of operation. To allow comfortable operation in the full grip mode, the width of the mouse 1 at half height in a longitudinal direction 27 perpendicular to symmetry plane 18 is preferably larger than 70 mm and preferably smaller than 90 mm.

The buttons 6-9 have button caps that are integrally formed with the housing of the mouse 1 and connect to adjacent portions of the housing via flexible hinge areas 19-22 on sides of the buttons 6-9 facing each other. Since the flexible hinge areas 19-22 are at least in touch pad surface area 17, portions of the caps of the buttons 6-9 also form portions of the touchpad surface area 17, the touchpad surface area can be relatively large. Nevertheless, operation of the touchpad surface area 17 is not compromised by seams between button caps and neighboring portions of the touchpad surface area 17. Furthermore, because the portions of the caps of the button that are part of the touchpad surface area are close to the flexible hinge areas 19-22, operating the buttons 6-9 by pressing in the area of these portions of the caps of the buttons 6-9 requires exertion of a relatively large force, so that inadvertently operating these buttons by touching the buttons only in the area of the caps of the button that are part of the touchpad surface will not or hardly occur in practice. Furthermore, the button caps can be manufactured efficiently, are held in place reliably and the seamless flexible hinge area also prevents fouling of the inside of the mouse due to movement of fingers over the transition from the button caps to other portions of the touchpad surface area.

Several features have been described as part of the same or separate embodiments. However, it will be appreciated that the scope of the invention also includes embodiments having combinations of all or some of these features other than the specific combinations of features embodied in the examples.

The invention claimed is:

1. A computer mouse, comprising a housing with:
   a bottom face for resting on a generally horizontal surface plane;
   a mouse button face projecting upwardly from said bottom face;
   a thumb face opposite of said mouse button face for engagement by a thumb of a user hand;
   at least two mouse buttons arranged at said mouse button face for operation by a finger of said user hand; and
   a touchpad surface area arranged at said mouse button face for operation by fingers of said user hand responsive to being touched and responsive to shifting movement of an area where said touchpad area is touched from one location on said touchpad surface area to another location on said touchpad surface area;
   the mouse further comprising circuitry for generating user interface display control signals in response to said touchpad surface area being touched and in response to said shifting movement of the area where said touchpad area is touched;

wherein said touchpad surface area is at least partially located between said mouse buttons; and wherein said mouse buttons have mouse button caps integrally formed with adjacent portions of the housing and connected to said adjacent portions of the housing via flexible hinge areas on sides of the button caps facing said touchpad surface area at least partially located there between, wherein the flexible hinge area of each mouse button of said mouse buttons is arranged between the mouse button and the touchpad surface area.

2. The computer mouse according to claim 1, comprising at least one sensor for detecting a mode of operation by a user, wherein the circuitry is configured to, in a first detected mode of operation, and in response to a displacement operation by a user, output a first signal for causing a user interface display of a computer system communicating with said mouse to show a first movement in a first direction in a displayed image and, in a second detected mode of operation, and in response to said displacement operation by a user, output a second signal different from said first signal for causing said user interface display to show a second movement in a second direction in the displayed image, said second direction being different from said first direction.

3. The computer mouse according to claim 1, wherein said mouse buttons have seams along respective outer perimeters, except at the flexible hinge areas which are seamless on the sides of the button caps facing each other and facing neighboring portions of the mouse button face forming the touchpad surface area.

4. The computer mouse according to claim 1, wherein said mouse buttons are operable by pressing a respective area of a respective button, causing the respective button to hinge about the respective flexible hinge area on the side of the respective button cap.

5. The computer mouse according to claim 1, wherein portions of the caps of the mouse buttons also form portions of the touchpad surface area.

6. The computer mouse according to claim 2, comprising at least four mouse buttons arranged symmetrical about a symmetry plane perpendicular to said surface plane.

7. The computer mouse according to claim 6, wherein, in a first mode of operation a first pair of the at least four mouse buttons function as a standard left and right mouse button; and in a second mode of operation, the other, second pair of the at least four mouse buttons function as a standard left and right mouse button.

8. The computer mouse according to claim 7, wherein said thumb face is also symmetrical about the symmetry plane and the mouse is elongate in a horizontal longitudinal direction perpendicular to the symmetry plane, wherein the mouse at half height, is at least 70 mm long in said horizontal longitudinal direction.

9. The computer mouse according to claim 1, the touchpad surface area comprises a central area of the mouse button face that is separate from any areas forming the mouse buttons surrounding the central area.

10. The computer mouse according to claim 1, wherein the mouse button face is slanted backward so that it is oriented at an average enclosed angle between the mouse button face and the surface plane of more than 60° degrees.

11. The computer mouse according to claim 10, wherein the mouse button face is slanted backward so that it is oriented at an average enclosed angle between the mouse button face and the surface plane of between 70° and 80° degrees.

12. The computer mouse according to claim 10, wherein the mouse button face is hollow, wherein lower mouse buttons on the mouse button face slant more than upper buttons on the mouse button face.

13. The computer mouse according to claim 6, wherein said mouse button face and said thumb face are each symmetrical about a common symmetry plane perpendicular to said surface plane.

14. The computer mouse according to claim 13, wherein said second movement in response to said displacement operation in a displacement direction in said second mode of operation is also caused by a displacement operation in said first mode of operation in a direction that is mirror symmetrical about said symmetry plane to said displacement direction, wherein a scrolling direction on the user interface display is determined based on a combination of a direction of input by the finger of said user hand moving along the surface or scrolling input interface of the sensor, and the mode of operation, wherein in a left handed mode of operation, the direction of an input that causes scrolling in up-down direction on the display is mirrored about the symmetry plane compared to right handed mode of operation.

15. The computer mouse according to claim 2, wherein the mouse buttons are used as the at least one sensor for detecting the mode of operation.

16. A computer mouse, comprising a housing with:
a bottom face for resting on a generally horizontal surface plane;
a mouse button face projecting upwardly from said bottom face;
a thumb face opposite of said mouse button face for engagement by a thumb of a user hand;
at least two mouse buttons arranged at said mouse button face for operation by a finger of said user hand; and
a sensor arranged at said mouse button face for operation by a finger of said user hand moving along its surface or scrolling input interface;
the mouse further comprising circuitry for generating user interface display control signals in response to said sensor being operated;
wherein said sensor is at least partially located in a sensor area forming a separate part of the mouse button face between said mouse buttons; and
wherein said mouse buttons have mouse button caps integrally formed with adjacent portions of the housing and connected to said adjacent portions of the housing via flexible hinge areas on sides of the button caps facing said sensor area located there between, wherein the flexible hinge area of each mouse button of said mouse buttons is arranged between the mouse button and the touchpad surface area.

* * * * *